(12) United States Patent
Zhang et al.

(10) Patent No.: US 11,493,663 B2
(45) Date of Patent: Nov. 8, 2022

(54) AERIAL-AND-GROUND DATA COMBINED GRAVITY CONVERSION METHOD AND SYSTEM

(71) Applicant: Chinese Academy of Geological Sciences, Beijing (CN)

(72) Inventors: Chong Zhang, Beijing (CN); Qingtian Lyu, Beijing (CN); Jiayong Yan, Beijing (CN); Guixiang Meng, Beijing (CN); Yitao Pu, Beijing (CN); Hanging Qiao, Beijing (CN)

(73) Assignee: Chinese Academy of Geological Sciences, Beijing (CN)

( * ) Notice: Subject to any disclaimer, the term of this patent is extended or adjusted under 35 U.S.C. 154(b) by 535 days.

(21) Appl. No.: 16/544,935

(22) Filed: Aug. 20, 2019

(65) Prior Publication Data
US 2019/0369287 A1   Dec. 5, 2019

(30) Foreign Application Priority Data
May 24, 2019   (CN) .......................... 201910441197.5

(51) Int. Cl.
*G01V 7/06*   (2006.01)
*G01C 21/04*   (2006.01)
*G01V 7/00*   (2006.01)
*G01V 7/16*   (2006.01)

(52) U.S. Cl.
CPC ............... *G01V 7/06* (2013.01); *G01C 21/04* (2013.01); *G01V 7/00* (2013.01); *G01V 7/16* (2013.01)

(58) Field of Classification Search
USPC ............................................. 702/2
See application file for complete search history.

(56) References Cited

U.S. PATENT DOCUMENTS

| 2002/0092350 A1* | 7/2002 | Etkin | ....................... G01V 7/16 73/382 G |
| 2009/0216451 A1* | 8/2009 | Barnes | ..................... G01V 7/00 702/5 |
| 2013/0166212 A1* | 6/2013 | Zhandov | .................. G01V 7/00 702/5 |

* cited by examiner

*Primary Examiner* — Paul D Lee
(74) *Attorney, Agent, or Firm* — Bayramoglu Law Offices LLC

(57) ABSTRACT

An aerial-and-ground data combined gravity conversion method includes the following steps: calculate the first estimated ground gravity by the Runge-Kutta format 1, and calculate the first error between the first estimated ground gravity and the measured ground gravity; calculate the second estimated ground gravity by the Runge-Kutta format 2, and calculate the second error between the second estimated ground gravity and the measured ground gravity; and select the smaller one from the first and second errors, use the corresponding Runge-Kutta format as the Runge-Kutta format for gravity conversion, and finish the gravity data conversion using the mentioned Runge-Kutta format.

10 Claims, 1 Drawing Sheet

Calculate the first estimated ground gravity by the Runge-Kutta format 1, and calculate the first error between the first estimated ground gravity and the measured ground gravity; — S11

Calculate the second estimated ground gravity by the Runge-Kutta format 2, and calculate the second error between the second estimated ground gravity and the measured ground gravity; — S12

Select the smaller one from the first and second errors, use the corresponding Runge-Kutta format as the Runge-Kutta format for gravity conversion, and finish the gravity data conversion using the mentioned Runge-Kutta format. — S13

AERIAL-AND-GROUND DATA COMBINED GRAVITY CONVERSION METHOD AND SYSTEM

CROSS REFERENCE TO THE RELATED APPLICATIONS

This application is based upon and claims priority to Chinese Patent Application No. CN 201910441197.5, filed on May 24, 2019, the entire contents of which are incorporated herein by reference.

TECHNICAL FIELD

The invention relates to the field of geophysical technology, especially to an aerial-and-ground data combined gravity conversion method and system.

BACKGROUND

Gravity data at different altitudes are required for the gravity matching navigation, mineral resources exploration and other professional areas to obtain accurate and reliable gravity database as well as the density distribution of underground materials, so as to establish a gravity database and invert the spatial and physical property distribution of the underground density bodies. In practice, however, both the aerial and ground gravity data are partially covered, other than the omnidirectionally covered satellite gravity data. The availability of accurate and reliable gravity data at different altitudes, especially ground gravity data, relies on the conversion of aerial gravity data to supplement the missing ground gravity data, obtain the gravity data for different altitudes and thereby improve the accuracy and reliability of gravity matching navigation and mineral resource exploration. Therefore, the gravity data conversion technology is the premise, while the accuracy and stability of the conversion method play a decisive role. Yet the downward conversion of gravity data is an ill-posed problem, and the conventional conversion methods are widely featured by complicated computation, low computational efficiency, low precision and high-frequency amplification, resulting in instability of high-frequency oscillation and small depth (generally no more than 5 times the dot pitch) to the conversion results. Besides, the conventional conversion methods are used for downward conversion to the ground by the aboveground gravity data only.

In general, the down-converted interpolation method in the spatial domain has complicated calculation and low precision. The FFT method finds a way out for complicated calculation, but it suffers instability due to the high-frequency amplification. The regularization method improves the stability of the FFT method, although it has an undesired conversion depth (generally no more than 5 times the dot pitch) and low computational accuracy. At last but not least, the integral iterative method realizes the stable, accurate and in-depth downward conversion of noise-free data, but the repeated iterations lead to the decrease of computational efficiency and the accumulation of noise, and eventually to the inaccuracy of results.

SUMMARY

The invention technologically aims to provide an aerial-and-ground data combined gravity conversion method and system, so as to improve the accuracy of gravity data conversion.

To address these technical issues, the invention provides an aerial-and-ground data combined gravity conversion method. The method comprises the following steps: calculate the first estimated ground gravity by the Runge-Kutta format 1, and calculate the first error between the first estimated ground gravity and the measured ground gravity; calculate the second estimated ground gravity by the Runge-Kutta format 2, and calculate the second error between the second estimated ground gravity and the measured ground gravity; and select the smaller one from the first and second errors, use the corresponding Runge-Kutta format as the Runge-Kutta format for gravity conversion, and finish the gravity data conversion using the mentioned Runge-Kutta format.

In some embodiments, the step of calculating the first estimated ground gravity by the Runge-Kutta format 1, and calculating the first error between the first estimated ground gravity and the measured ground gravity comprises the following steps: calculate the estimated aerial gravity $u_{(k_2)}(x,y,z_0+a_2h)$ by the aerial gravity data $u(x,y,z_0)$ and the gradient data $k_1$ through the fourth-order Runge-Kutta format 1; calculate the aerial estimated gravity gradient $k_2$ by the integrated second vertical derivative; repeat the mentioned steps to work out the estimated gravity gradients $k_3$ and $k_4$; calculate the first estimated ground gravity $u_c(x,y,z_0+h)$ by the fourth-order Runge-Kutta format 1; calculate the first error $\varepsilon$ by a root-mean-square error method.

In some embodiments, the step of calculating the estimated aerial gravity $u_{(k_2)}(x,y,z_0+a_2h)$ by the aerial gravity data $u(x,y,z_0)$ and gradient data $k_1$ through the fourth-order Runge-Kutta format 1 comprises the following steps: calculate the estimated aerial gravity according to the following formula:

$$u_{(k_2)}(x,y,z_0+a_2h)=u(x,y,z_0)+b_{21}k_1$$

where, $a_2$ and $b_{21}$ are constants, $u(x,y,z_0)$ is the aerial gravity data, $k_1=u_z(x,y,z_0)$ is the aerial gravity gradient data, and $u_{(k_2)}(x,y,z_0+a_2h)$ is the estimated aerial gravity.

In some embodiments, the mentioned Runge-Kutta format 1 is:

$$\begin{cases} k_1 = u_z(x, y, z_0) \\ k_2 = u_{z(k_2)}(x, y, z_0 + 1/2h) \\ k_3 = u_{z(k_3)}(x, y, z_0 + 1/2h) \\ k_4 = u_{z(k_4)}(x, y, z_0 + h) \\ u_c(x, y, z_0 + h) = u(x, y, z_0) + (1/6k_1 + 2/6k_2 + 2/6k_3 + 1/6k_4) \end{cases}$$

where, $k_1$, $k_2$ and $k_3$ are the estimated gravity gradients for different air positions, $k_4$ is the estimated gravity gradient for the ground position, $u(x,y,z_0)$ is the aerial gravity data, and $u_c(x,y,z_0+h)$ is the first estimated ground gravity.

In some embodiments, the mentioned Runge-Kutta format 2 is:

$$\begin{cases} k_1 = u_z(x, y, z_0) \\ k_2 = u_{z(k_2)}(x, y, z_0 + 1/3h) \\ k_3 = u_{z(k_3)}(x, y, z_0 + 2/3h) \\ k_4 = u_{z(k_4)}(x, y, z_0 + h) \\ u'_c(x, y, z_0 + h) = u(x, y, z_0) + (1/8k_1 + 3/8k_2 + 3/8k_3 + 1/8k_4) \end{cases}$$

where, $k_1$, $k_2$ and $k_3$ are the estimated gravity gradients for different air positions, $k_4$ is the estimated gravity gradient for the ground position, $u(x,y,z_0)$ is the aerial gravity data, and $u'_c(x,y,z_0+h)$ is the second estimated ground gravity.

In some embodiments, the mentioned aerial-and-ground data combined gravity conversion method is applied to the fields of gravity matching navigation and mineral resource exploration.

In addition, the invention provides an aerial-and-ground data combined gravity conversion system. The mentioned system comprises one or more processors, as well as a storage device for storing one or more programs. When the mentioned one or more programs are executed by the mentioned processor(s), the mentioned processor(s) will realize the aerial-and-ground data combined gravity conversion method as described above.

With such a design, the invention has at least the following advantages:

It can effectively enhance the accuracy of gravity data conversion.

BRIEF DESCRIPTION OF THE DRAWINGS

All the above is only an overview of the technical solutions for the invention. To better understand the technical means involved, the figures and specific embodiments are integrated to illustrate the invention in detail.

DETAILED DESCRIPTION OF THE EMBODIMENTS

The preferred embodiments of the invention are described in conjunction with the figures. It is to be understood that the preferred embodiments herein are intended to describe and illustrate the invention only, but without any limit to the invention.

The invention provides an aerial-and-ground data combined gravity conversion Runge-Kutta method. Compared with the conventional methods, the invention utilizes the fourth-order Runge-Kutta format to implement easy and straightforward computation. The fourth-order Runge-Kutta format hereof uses the vertical derivatives at four middle altitude points before and after the conversion for calculation, which improves the accuracy of the conversion result. In addition, the derivatives are calculated by the integrated second vertical derivative method, significantly improving the stability and accuracy of the conversion. The invention aims to provide an aerial-and-ground data combined gravity conversion Runge-Kutta method, to solve the problems in the background set forth above.

Figure 1:
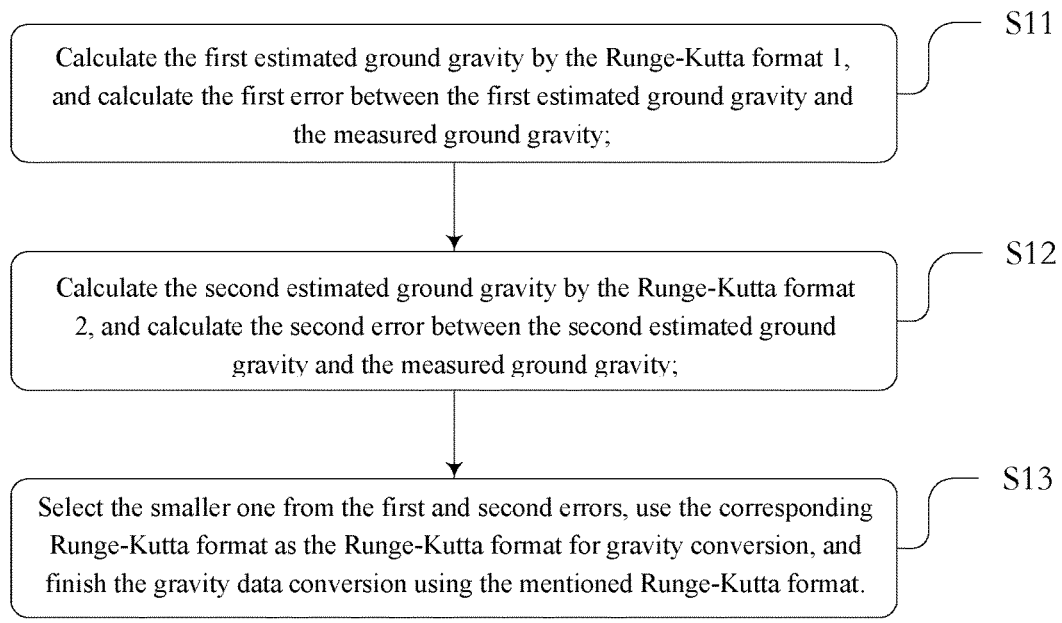
FIG. 1 is a flow chart of the aerial-and-ground data combined gravity conversion method provided in the embodiments of the invention.

FIG. 1 is a flow chart of the aerial-and-ground data combined gravity conversion method provided in the embodiments of the invention. As shown in FIG. 1, the aerial-and-ground data combined gravity conversion method provided in the embodiments of the invention comprises:

S11, calculate the first estimated ground gravity by the Runge-Kutta format 1, and calculate the first error between the first estimated ground gravity and the measured ground gravity.

S12, calculate the second estimated ground gravity by the Runge-Kutta format 2, and calculate the second error between the second estimated ground gravity and the measured ground gravity.

S13, select the smaller one from the first and second errors, use the corresponding Runge-Kutta format as the Runge-Kutta format for gravity conversion, and finish the gravity data conversion using the mentioned Runge-Kutta format. The Runge-Kutta format mentioned herein may be either the Runge-Kutta format 1 or the Runge-Kutta format 2.

In order to overcome the existing technical shortcomings and achieve the goals set forth above, the invention proposes an aerial-and-ground data combined gravity conversion Runge-Kutta method. The specific steps of its technical solution are as follows:

1. Calculate the estimated aerial gravity $u_{(k_2)}(x,y,z_0+a_2h)$ by the aerial gravity data $u(x,y,z_0)$ and gradient data $k_1$ through fourth-order Runge-Kutta format 1;
2. Calculate the estimated gravity gradient $k_2$ by the Integrated Second Vertical Derivative (ISVD) method;
3. Repeat steps 1-2 to calculate the estimated gravity gradients $k_3$ and $k_4$ in the air positions respectively;
4. Calculate the ground gravity data $u_c(x,y,z_0+h)$ by the fourth-order Runge-Kutta format 1;
5. Compare and calculate the error $\varepsilon$ between the gravity data $u_c(x,y,z_0+h)$ and the measured data $u_e(x,y,z_0+h)$ by the root-mean-square error method;
6. Repeat steps 1-5 by the fourth-order Runge-Kutta format 2;
7. Select the fourth-order Runge-Kutta format with the smaller error, and repeat steps 1-4 by the aerial gravity data $u(x,y,z_0)$ to obtain the aerial-and-ground data combined gravity Runge-Kutta conversion result $u(x,y,z_0+h)$.

The invention is a breakthrough in the field of geophysical technology. While realizing the conversion of gravity data obtained from different observation surfaces, the technology enhances the accuracy of conversion, with practical significance to the accuracy improvement of gravity exploration as well as very important significance to the theoretical geological research and practical mineral exploration.

In step 1, $u(x,y,z_0)$ and $k_1 = u_z(x,y,z_0)$ are gravity data and gradient data at the altitude of $z_0$, $u_{(k_2)}(x,y,z_0+a_2h)$ is the aerial gravity at a distance of $z_0+a_2h$ above ground:

$$u_{(k_2)}(x,y,z_0+a_2h) = u(x,y,z_0) + b_{21}k_1 \quad (1)$$

h is a positive number indicating the conversion altitude and $a_2$ and $b_{21}$ are constants obtained by the fourth-order Runge-Kutta format 1.

In step 2, $k_2 = u_{z(k_2)}(x,y,z_0+a_2h)$ is the estimated gravity gradient at an altitude of $z_0+a_2h$.

The computational process of the Integrated Second Vertical Derivative (ISVD) method in step 2 above is as follows:

Calculate the scalar potential $\tilde{v}(x,y,z_0+a_2h)$ of $\tilde{u}(x,y,z_0+a_2h)$ by the gravity data conversion method in the wavenumber domain:

$$\tilde{v}(x, y, z_0 + a_2h) = F^{-1}\left[F[\tilde{u}(x, y, z_0 + a_2h)]\frac{1}{2\pi\sqrt{k_x^2 + k_y^2}}\right] \quad (2)$$

where F is the Fourier transform, $F^{-1}$ is the inverse Fourier transform, $k_x, k_y$ is the coordinate in the wavenumber domain corresponding to the coordinate x,y in the spatial domain, $\tilde{u}(k_x, k_x, z_0)$ is the expression of $u(x,y,z_0)$ in the wavenumber domain, and $$\frac{1}{2\pi\sqrt{k_x^2 + k_y^2}}$$

is the vertical integral operator in the wavenumber domain.

The wavenumber domain mentioned above is obtained by Fourier transform, wherein the Fourier transform and the inverse transform are calculated as follows:

$$\begin{cases} \tilde{u}(k_x, k_x, z_0) = F[u(x, y, z_0)] \\ u(x, y, z_0) = F^{-1}[\tilde{u}(k_x, k_x, z_0)] \end{cases}. \quad (3)$$

Then calculate the second derivative of the scalar potential $\tilde{v}(x,y,z_0+a_2h)$ in the horizontal direction by the finite difference method:

$$\begin{cases} \tilde{v}_{xx}(x, y, z_0 + a_2h) = [\tilde{v}(x + \Delta x, y, z_0 + a_2h) + \tilde{v}(x - \Delta x, y, z_0 + a_2h) - 2\tilde{v}(x, y, z_0 + a_2h)]/\Delta x^2 \\ \tilde{v}_{yy}(x, y, z_0 + a_2h) = [\tilde{v}(x + \Delta y, y, z_0 + a_2h) + \tilde{v}(x - \Delta y, y, z_0 + a_2h) - 2\tilde{v}(x, y, z_0 + a_2h)]/\Delta y^2 \end{cases}. \quad (4)$$

where $\Delta x, \Delta y$ is the sampling interval in the horizontal direction.

At last, obtain the second derivative of the scalar potential $\tilde{v}(x,y,z_0+a_2h)$ in the vertical direction by the Laplace's equation, that is, the first derivative $\tilde{u}_z(x,y,z_0+a_2h)$ of the gravity data $\tilde{u}(x,y,z_0+a_2h)$ data in the vertical direction:

$$\begin{aligned} \tilde{u}_z(x, y, z_0 + a_2h) &= \tilde{v}_{zz}(x, y, z_0 + a_2h) \quad (5) \\ &= -[\tilde{v}_{xx}(x, y, z_0 + a_2h) + \tilde{v}_{yy}(x, y, z_0 + a_2h)]. \end{aligned}$$

Obtain the following by the inverse Fourier transform, $$\begin{aligned} u_{z(k_2)}(x, y, z_0 + a_2h) &= u_z(x, y, z_0 + a_2h) \quad (6) \\ &= F^{-1}[\tilde{u}_z(x, y, z_0 + a_2h)]. \end{aligned}$$

In step 3, $k_3=u_{z(k_3)}(x,y,z_0+a_3h)$ and $k_4=u_{z(k_4)}(x,y,z_0+a_4h)$ are the estimated gravity gradients calculated by steps 1-2 for the altitudes $z_0+a_3h$ and $z_0+a_4h$.

The fourth-order Runge-Kutta format 1 in step 4 is:

$$\begin{cases} k_1 = u_z(x, y, z_0) \\ k_2 = u_{z(k_2)}(x, y, z_0 + 1/2h) \\ k_3 = u_{z(k_3)}(x, y, z_0 + 1/2h) \\ k_4 = u_{z(k_4)}(x, y, z_0 + h) \\ u_c(x, y, z_0 + h) = u(x, y, z_0) + (1/6k_1 + 2/6k_2 + 2/6k_3 + 1/6k_4) \end{cases} \quad (7)$$

$u_c(x,y,z_0+h)$ is calculated using the format (7).

The root mean square error in step 5 is $$\varepsilon = \sqrt{\frac{1}{N} \sum_{i=1,j=1}^{N} (u_c(x_i, y_j, z_0 + h) - u_e(x_i, y_j, z_0 + h))}.$$

The fourth-order Runge-Kutta format 2 in step 6 is:

$$\begin{cases} k_1 = u_z(x, y, z_0) \\ k_2 = u_{z(k_2)}(x, y, z_0 + 1/3h) \\ k_3 = u_{z(k_3)}(x, y, z_0 + 2/3h) \\ k_4 = u_{z(k_4)}(x, y, z_0 + h) \\ u'_c(x, y, z_0 + h) = u(x, y, z_0) + (1/8k_1 + 3/8k_2 + 3/8k_3 + 1/8k_4) \end{cases} \quad (8)$$

Figure 2:
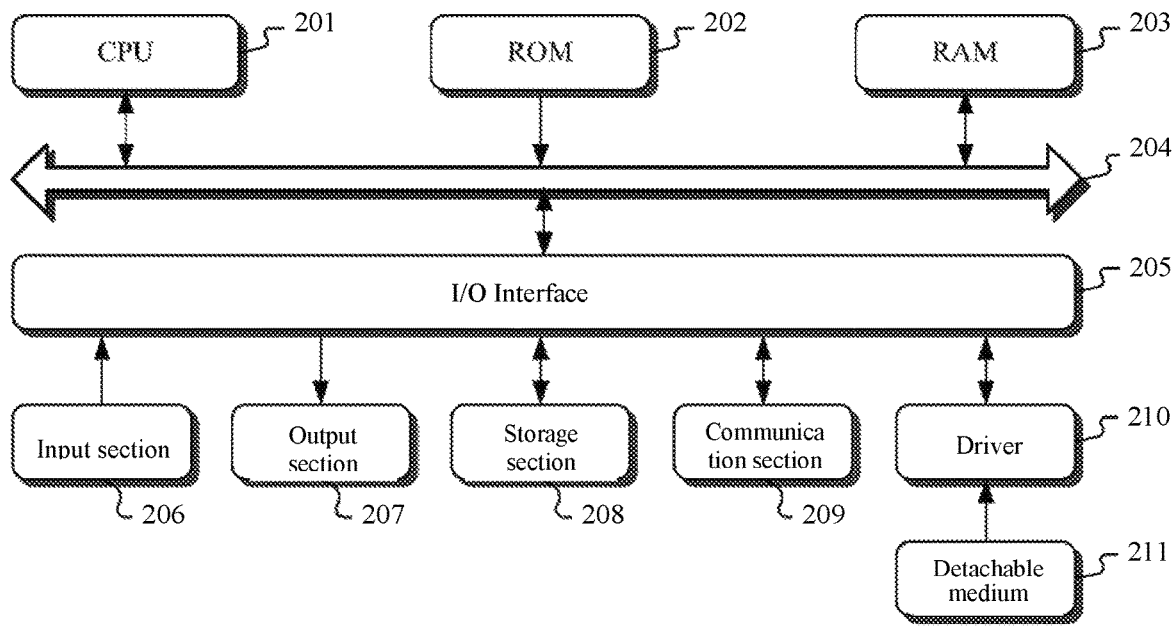
FIG. 2 is a structural diagram of the aerial-and-ground data combined gravity conversion system provided in the embodiments of the invention.

FIG. 2 is a structural diagram of the aerial-and-ground data combined gravity conversion system of the invention. As shown in FIG. 2, the aerial-and-ground data combined gravity conversion system comprises: a Central Processing Unit (CPU) 201 that can execute appropriate actions and processes in accordance with the programs stored in the read-only memory (ROM) or those loaded into the random access memory (RAM) 203 from a memory 208. A variety of programs and data required for system operation are also stored in the RAM 203. The CPU 201, ROM 202, and RAM 203 are interconnected through a bus 204. The input/output (I/O) interface 205 is also coupled to the bus 204.

The following components are connected to the I/O interface 205: an input section 206 comprising a keyboard and a mouse; an output section 207 comprising a cathode ray tube (CRT), a liquid crystal display (LCD) and a loudspeaker; a storage section 208 comprising a hard disk; and a communication section 209 comprising a LAN card, a modem and other network interfaces. The communication section 209 performs communication processing via a network, such as the Internet. A driver 210 is also connected to the I/O interface 205 as needed. A detachable medium 211, which may be a disk, CD a magneto-optical disk or a semiconductor memory, is mounted on the driver 210 as needed, so that the computer programs read from the medium can be installed into the storage section 208 as required.

In particular, according to the embodiments of the invention, the processes described in the flow chart may be implemented as computer software programs. For example, a computer program product is involved in the embodiment of the invention, which comprises a computer program carried on a computer readable medium; the computer program contains the program codes for executing the method as shown in the flow chart. In such embodiment, the computer program can be downloaded from the network and installed via the communication section 209, and/or be installed through the detachable medium 211. When the computer program is executed by CPU 201, the functions defined in the invention are available. It is important to note that the computer-readable medium involved in the invention may be a computer readable signal medium, or a computer-readable storage medium, or any combination of both. The computer-readable storage medium can be, for example, but not limited to, an electronic, magnetic, optical, electromagnetic, infrared, or semiconductor system, apparatus or device, or any combination of them. The specific examples of the computer readable storage medium may include, but are not limited to, an electric connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of them. In the invention, the computer readable storage medium may be any tangible medium that can carry or store a program available for independent or combined application by the instruction execution system, apparatus or device. The computer readable signal medium in the invention may include some data signals communicated in the baseband or as part of a carrier, which carries the computer readable program codes. The communicated data signals can take a variety of forms including, but not limited to, electromagnetic signals, optical signals, or any appropriate combination of them. The computer readable signal medium can also be any other computer readable medium than a computer readable storage medium, which can transmit, communicate or transport the programs available for independent or combined application by the instruction execution system, apparatus or device. The program codes carried on the computer readable medium can be transmitted by any suitable medium, including but not limited to wireless, wire, fiber optic cable, RF, or any appropriate combination of them.

The flow chart and block diagram illustrate the architecture, functionality and operation potentially accomplished by the systems, methods and computer program products involved in the embodiments of the invention. In this regard, each block of the flow chart or block diagram can represent a module, a program segment, or a section of a code that includes one or more executable instructions for implementing the specified logic functions. It should be noted that in some alternative embodiments, the functions indicated in the blocks may also be performed in a different order than that illustrated in the diagrams. For example, two consecutive blocks may be executed substantially in parallel, which may sometimes be executed in the reverse order as required by the functionality involved. Furthermore, every block in the block diagram and/or flow chart, as well as the combinations of the blocks in the block diagram and/or flow chart can be implemented by a dedicated hardware-based system performing the specified function or operation, or by a combination of dedicated hardware and computer instructions.

The units involved in the embodiments of the invention may be implemented by either software or hardware.

The invention provides an aerial-and-ground data combined gravity conversion method. Compared with the conventional methods, the invention utilizes the fourth-order Runge-Kutta format to implement easy and straightforward computation. The fourth-order Runge-Kutta format hereof uses the vertical derivatives at four middle altitude points before and after the conversion for calculation, which improves the accuracy of the conversion result. In addition, the derivatives are calculated by the integrated second vertical derivative method, significantly improving the stability and accuracy of the conversion. The fourth-order Runge-Kutta format has different expression formulas, making it possible to obtain the conversion results of different ground gravity data. The accuracy of the final conversion results can be optimized by the comparing different converted ground gravity data with the measured ground gravity data of some known regions and selecting the fourth-order Runge-Kutta format with smaller calculation errors.

All the above is nothing but a preferred embodiment of the invention, and by no means shall it impose any limitation against any form of the invention. Any person skilled in the art who makes simple modifications, equivalent changes or modifications to the disclosed technical contents will be held accountable within the protection scope of the invention.

What is claimed is:

1. A method of mineral resource exploration using an aerial-and-ground data combined gravity conversion method, comprising the following steps:
    S1: calculating, by one or more processors, a first estimated ground gravity by inputting a first measured aerial gravity data into a first Runge-Kutta format, and calculating a first error between the first estimated ground gravity and a measured ground gravity;
    S2: calculating, by the one or more processors, a second estimated ground gravity by inputting the first measured aerial gravity data into a second Runge-Kutta format, and calculating a second error between the second estimated ground gravity and the measured ground gravity; and
    S3: selecting, by the one or more processors, a smaller error from the first error and the second error, and converting a second measured aerial gravity data into a third estimated ground gravity by using the Runge-Kutta format to the smaller error;
    S4: estimating, by the one or more processors, a spatial and physical property distribution of underground elements by utilizing the second measured aerial gravity data and the third estimated ground gravity; and
    S5: carrying out mineral resource exploration based on the spatial and physical property distribution.

2. The method according to claim 1, wherein the step S1 comprises the following steps:
    S11: calculating, by the one or more processors, an estimated aerial gravity $u_{(k_2)}(x,y,z_0+a_2h)$ by the aerial gravity data $u(x,y,z_0)$ and calculating a first estimated aerial gradient $k_1$ by using the first Runge-Kutta format, wherein x, y, and $z_0$ represents a three-dimensional spatial location of the first measured aerial gravity data, with $z_0$ representing the initial altitude, $a_2$ is a constant, and h is a positive number indicating the conversion altitude;
    S12: calculating, by the one or more processors, a second estimated aerial gravity gradient $k_2$ by an integrated second vertical derivative;
    S13: calculating, by the one or more processors, a third estimated gravity gradient $k_3=u_{z(k_3)}(x,y,z_0+a_3h)$ and a fourth estimated gravity gradient $k_4=u_{z(k_4)}(x,y,z_0+a_4h)$, wherein $a_3$ and $a_4$ are constants;
    S14: calculating, by the one or more processors, the first estimated ground gravity $u_c(x,y,z_0+h)$ by the first Runge-Kutta format;
    S15: calculating, by the one or more processors, the first error $\varepsilon$ by a root-mean-square error method.

3. The method according to claim 2, wherein the step S11 comprises the following steps:
    calculating, by the one or more processors, the estimated aerial gravity according to the following formula:

$$u_{(k_2)}(x,y,z_0+a_2h)=u(x,y,z_0)+b_{21}k_1$$

wherein $a_2$ and $b_{21}$ are constants, $u(x,y,z_0)$ is the arial gravity data, $k_1=u_z(x,y,z_0)$ is the first aerial gravity gradient data, and $u_{(k_2)}(x,y,z_0+a_2h)$ is the estimated aerial gravity.

4. The aerial and ground data combined gravity conversion method according to claim 2, wherein the first Runge-Kutta format is:

$$\begin{cases} k_1 = u_z(x, y, z_0) \\ k_2 = u_{z(k_2)}(x, y, z_0 + 1/2h) \\ k_3 = u_{z(k_3)}(x, y, z_0 + 1/2h) \\ k_4 = u_{z(k_4)}(x, y, z_0 + h) \\ u_c(x, y, z_0 + h) = u(x, y, z_0) + (1/6k_1 + 2/6k_2 + 2/6k_3 + 1/6k_4) \end{cases}$$

wherein $k_1$, $k_2$ and $k_3$ are the first estimated gravity gradient, the second estimated gravity gradient and the third estimated gravity gradient for three air positions, $k_4$ is the fourth estimated gravity gradient for a ground position, $u(x,y,z_0)$ is the aerial gravity data, and $u_c(x,y,z_0+h)$ is the first estimated ground gravity, wherein $u_c$ denotes ground gravity, $u_z$ denotes aerial gravity, and u denotes gravity in general.

5. The method according to claim 1, wherein the second Runge-Kutta format is:

$$\begin{cases} k_1 = u_z(x, y, z_0) \\ k_2 = u_{z(k_2)}(x, y, z_0 + 1/3h) \\ k_3 = u_{z(k_3)}(x, y, z_0 + 2/3h) \\ k_4 = u_{z(k_4)}(x, y, z_0 + h) \\ u'_c(x, y, z_0 + h) = u(x, y, z_0) + (1/8k_1 + 3/8k_2 + 3/8k_3 + 1/8k_4) \end{cases}$$

wherein $k_1$, $k_2$ and $k_3$ are the first estimated gravity gradient, the second estimated gravity gradient and the third estimated gravity gradient for different air positions, $k_4$ is the estimated gravity gradient for a ground position, $u(x,y,z_0)$ is the aerial gravity data, and $u_c'(x,y,z_0+h)$ is the second estimated ground gravity, wherein $u_c$ denotes ground gravity, $u_z$ denotes aerial gravity, and u denotes gravity in general.

6. An aerial-and-ground data combined gravity conversion system, comprising:
   one or more processors;
   a storage device, for storing one or more programs, when the one or more programs are executed by the one or more processors, the one or more processors execute the method according to claim 1.

7. The aerial-and-ground data combined gravity conversion system according to claim 6, wherein the step S1 comprises the following steps:
   S11: calculating, by the one or more processors, an estimated aerial gravity $u_{(k_2)}(x,y,z_0+a_2h)$ by the aerial gravity data $u(x,y,z_0)$ and calculating a first estimated aerial gradient $k_1$ by using the first Runge-Kutta format, wherein x, y, and $z_0$ represents a three-dimensional spatial location of the first measured aerial gravity data, with $z_0$ representing the initial altitude, $a_2$ is a constant, and h is a positive number indicating the conversion altitude;
   S12: calculating, by the one or more processors, a second estimated aerial gravity gradient $k_2$ by an integrated second vertical derivative;
   S13: calculating, by the one or more processors, a third estimated gravity gradient $k_3=u_{z(k_3)}(x,y,z_0+a_3h)$ and a fourth estimated gravity gradient $k_4=u_{z(k_4)}(x,y,z_0+a_4h)$, wherein $a_3$ and $a_4$ are constants;
   S14: calculating, by the one or more processors, the first estimated ground gravity $u_c(x,y,z_0+h)$ by the first Runge-Kutta format;
   S15: calculating, by the one or more processors, the first error ε by a root-mean-square error method.

8. The aerial-and-ground data combined gravity conversion system according to claim 7, wherein the step S11 comprises the following steps:
   calculating, by the one or more processors, the estimated aerial gravity according to the following formula:

$$u_{(k_2)}(x,y,z_0+a_2h)=u(x,y,z_0)+b_{21}k_1$$

wherein $a_2$ and $b_{21}$ are constants, $u(x,y,z_0)$ is the aerial gravity data, $k_1=u_z(x,y,z_0)$ is the first aerial gravity gradient data, and $u_{(k_2)}(x,y,z_0+a_2h)$ is the estimated aerial gravity.

9. The aerial-and-ground data combined gravity conversion system according to claim 7, wherein the first Runge-Kutta format is:

$$\begin{cases} k_1 = u_z(x, y, z_0) \\ k_2 = u_{z(k_2)}(x, y, z_0 + 1/2h) \\ k_3 = u_{z(k_3)}(x, y, z_0 + 1/2h) \\ k_4 = u_{z(k_4)}(x, y, z_0 + h) \\ u_c(x, y, z_0 + h) = u(x, y, z_0) + (1/6k_1 + 2/6k_2 + 2/6k_3 + 1/6k_4) \end{cases}$$

wherein $k_1$, $k_2$ and $k_3$ are the first estimated gravity gradient, the second estimated gravity gradient and the third estimated gravity gradient for three air positions, $k_4$ is the fourth estimated gravity gradient for a ground position, $u(x,y,z_0)$ is the aerial gravity data, and $u_c(x,y,z_0+h)$ is the first estimated ground gravity, wherein $u_c$ denotes ground gravity, $u_z$ denotes aerial gravity, and u denotes gravity in general.

10. The aerial-and-ground data combined gravity conversion system according to claim 6, wherein the second Runge-Kutta format is:

$$\begin{cases} k_1 = u_z(x, y, z_0) \\ k_2 = u_{z(k_2)}(x, y, z_0 + 1/3h) \\ k_3 = u_{z(k_3)}(x, y, z_0 + 2/3h) \\ k_4 = u_{z(k_4)}(x, y, z_0 + h) \\ u'_c(x, y, z_0 + h) = u(x, y, z_0) + (1/8k_1 + 3/8k_2 + 3/8k_3 + 1/8k_4) \end{cases}$$

wherein $k_1$, $k_2$ and $k_3$ are the first estimated gravity gradient, the second estimated gravity gradient and the third estimated gravity gradient for different air positions, $k_4$ is the estimated gravity gradient for a ground position, $u(x,y,z_0)$ is the aerial gravity data, and $u_c'(x,y,z_0+h)$ is the second estimated ground gravity, wherein $u_c$ denotes ground gravity, $u_z$ denotes aerial gravity, and u denotes gravity in general.

* * * * *